(12) United States Patent
Vilcek et al.

(10) Patent No.: US 7,597,382 B2
(45) Date of Patent: Oct. 6, 2009

(54) NOISE REDUCTION MEMBER AND SYSTEM

(75) Inventors: Mark J. Vilcek, Lake Orion, MI (US); Steve Zdrojewski, Deckerville, MI (US)

(73) Assignee: Zephyros, Inc., Romeo, MI (US)

( * ) Notice: Subject to any disclaimer, the term of this patent is extended or adjusted under 35 U.S.C. 154(b) by 5 days.

(21) Appl. No.: 11/420,090

(22) Filed: May 24, 2006

(65) Prior Publication Data

US 2006/0272884 A1 Dec. 7, 2006

Related U.S. Application Data

(60) Provisional application No. 60/688,255, filed on Jun. 7, 2005.

(51) Int. Cl.
*B62D 25/00* (2006.01)
(52) U.S. Cl. .............................. 296/187.02; 296/193.06
(58) Field of Classification Search ............ 296/187.02, 296/193.06; 24/295
See application file for complete search history.

(56) References Cited

U.S. PATENT DOCUMENTS

| | | |
|---|---|---|
| 3,400,182 A | 9/1968 | Kolt |
| 4,463,870 A | 8/1984 | Coburn, Jr. et al. |
| 4,671,910 A | 6/1987 | Fuhrmann |
| 4,751,249 A | 6/1988 | Wycech |
| 4,810,548 A | 3/1989 | Ligon, Sr. et al. |
| 4,813,690 A | 3/1989 | Coburn, Jr. |
| 4,978,562 A | 12/1990 | Wycech |
| 5,102,188 A | 4/1992 | Yamane |
| 5,124,186 A | 6/1992 | Wycech |
| 5,160,465 A | 11/1992 | Soderberg |
| 5,213,391 A | 5/1993 | Takagi |
| 5,344,208 A | 9/1994 | Bien et al. |
| 5,506,025 A | 4/1996 | Otto et al. |
| 5,575,526 A | 11/1996 | Wycech |
| 5,631,027 A | 5/1997 | Takabatake |
| 5,642,914 A | 7/1997 | Takabatake |
| 5,678,826 A | 10/1997 | Miller |
| 5,725,272 A | 3/1998 | Jones |
| 5,755,486 A | 5/1998 | Wycech |
| 5,766,719 A | 6/1998 | Rimkus |
| 5,806,915 A | 9/1998 | Takabatake |
| 5,904,024 A | 5/1999 | Miwa |
| 5,931,474 A | 8/1999 | Chang et al. |
| 5,932,680 A | 8/1999 | Heider |

(Continued)

FOREIGN PATENT DOCUMENTS

DE 3838655 * 5/1990

(Continued)

OTHER PUBLICATIONS

Hopton et al., Application of a Structural Reinforcing Material to Improve Vehicle NVH Characteristics.

(Continued)

*Primary Examiner*—Dennis H Pedder
(74) *Attorney, Agent, or Firm*—Dobrusin & Thennisch PC

(57) ABSTRACT

There is disclosed a noise reduction member. Preferably, the noise reduction member is employed for sealing or baffling within a pillar or other structure of an automotive vehicle, although not required.

1 Claim, 2 Drawing Sheets

U.S. PATENT DOCUMENTS

| | | | |
|---|---|---|---|
| 5,992,923 A | 11/1999 | Wycech | |
| 6,003,274 A | 12/1999 | Wycech | |
| 6,006,484 A | 12/1999 | Geissbuhler | |
| 6,092,864 A | 7/2000 | Wycech et al. | |
| 6,093,358 A | 7/2000 | Schiewe et al. | |
| 6,096,403 A | 8/2000 | Wycech et al. | |
| 6,103,341 A | 8/2000 | Barz et al. | |
| 6,131,897 A | 10/2000 | Barz et al. | |
| 6,146,565 A | 11/2000 | Keller | |
| 6,150,428 A | 11/2000 | Hanley, IV et al. | |
| 6,199,940 B1 * | 3/2001 | Hopton et al. | 296/187.02 |
| 6,237,304 B1 | 5/2001 | Wycech | |
| 6,247,287 B1 | 6/2001 | Takabatake | |
| 6,253,524 B1 | 7/2001 | Hopton et al. | |
| 6,281,260 B1 | 8/2001 | Hanley, IV et al. | |
| 6,315,938 B1 | 11/2001 | Jandali | |
| 6,319,964 B1 | 11/2001 | Blank et al. | |
| 6,321,793 B1 | 11/2001 | Czaplicki et al. | |
| 6,347,799 B1 | 2/2002 | Williams et al. | |
| 6,368,438 B1 | 4/2002 | Chang et al. | |
| 6,382,635 B1 | 5/2002 | Fitzgerald | |
| 6,383,610 B1 | 5/2002 | Barz et al. | |
| 6,406,078 B1 | 6/2002 | Wycech | |
| 6,413,611 B1 | 7/2002 | Roberts et al. | |
| 6,419,305 B1 | 7/2002 | Larsen | |
| 6,475,577 B1 | 11/2002 | Hopton et al. | |
| 6,491,336 B1 | 12/2002 | Beckmann et al. | |
| 6,502,821 B2 | 1/2003 | Schneider | |
| 6,523,857 B1 | 2/2003 | Hopton et al. | |
| 6,546,693 B2 | 4/2003 | Wycech | |
| 6,585,202 B2 | 7/2003 | Broccardo et al. | |
| 6,691,468 B2 | 2/2004 | Helferty | |
| 6,722,720 B2 | 4/2004 | Donick et al. | |
| 6,846,559 B2 * | 1/2005 | Czaplicki et al. | 428/355 EP |
| 6,882,550 B1 | 4/2005 | Baumgart | |
| 6,920,693 B2 | 7/2005 | Hankins et al. | |
| 6,988,585 B2 | 1/2006 | Mourieras | |
| 7,141,194 B1 | 11/2006 | Beckmann | |
| 7,141,206 B2 | 11/2006 | Ishikawa et al. | |
| 7,144,071 B2 | 12/2006 | Le Gall et al. | |
| 7,199,165 B2 * | 4/2007 | Kassa et al. | 521/135 |
| 2002/0053179 A1 | 5/2002 | Wycech | |
| 2002/0164450 A1 | 11/2002 | Lupini et al. | |
| 2003/0001469 A1 | 1/2003 | Hankins et al. | |
| 2003/0201572 A1 | 10/2003 | Coon et al. | |
| 2003/0209921 A1 | 11/2003 | Coon et al. | |
| 2003/0218019 A1 | 11/2003 | Le Gall et al. | |
| 2004/0011282 A1 | 1/2004 | Myers et al. | |
| 2004/0074150 A1 | 4/2004 | Wycech | |
| 2004/0135058 A1 | 7/2004 | Wycech | |
| 2004/0177580 A1 * | 9/2004 | Tremelling | 52/426 |
| 2004/0239148 A1 * | 12/2004 | Ratet | 296/187.02 |
| 2004/0262810 A1 | 12/2004 | Barz et al. | |
| 2004/0262853 A1 | 12/2004 | Larsen et al. | |
| 2004/0266898 A1 | 12/2004 | Kassa et al. | |
| 2005/0081383 A1 | 4/2005 | Kosal et al. | |
| 2005/0082111 A1 | 4/2005 | Weber | |
| 2005/0087899 A1 | 4/2005 | Coon et al. | |
| 2005/0126848 A1 | 6/2005 | Siavoshai et al. | |
| 2005/0172486 A1 | 8/2005 | Carlson et al. | |
| 2005/0194706 A1 | 9/2005 | Kosal et al. | |
| 2005/0212326 A1 | 9/2005 | Marion | |
| 2005/0230165 A1 | 10/2005 | Thomas et al. | |
| 2005/0249936 A1 | 11/2005 | Ui et al. | |
| 2005/0260399 A1 | 11/2005 | Finerman | |
| 2005/0268454 A1 | 12/2005 | White | |
| 2005/0269840 A1 | 12/2005 | Finerman et al. | |
| 2005/0279567 A1 | 12/2005 | Ito | |
| 2006/0000186 A1 | 1/2006 | Carlson et al. | |
| 2006/0020076 A1 | 1/2006 | Finerman et al. | |
| 2006/0041227 A1 | 2/2006 | Takabatake | |
| 2006/0043772 A1 | 3/2006 | Richardson | |
| 2006/0057333 A1 | 3/2006 | Brahim | |
| 2006/0065483 A1 | 3/2006 | Thomas | |
| 2006/0124386 A1 | 6/2006 | Helferty | |
| 2006/0267378 A1 | 11/2006 | Czaplicki et al. | |
| 2006/0272884 A1 | 12/2006 | Vilcek et al. | |
| 2007/0074808 A1 | 4/2007 | Deachin et al. | |
| 2007/0090666 A1 | 4/2007 | Brennecke et al. | |
| 2007/0122510 A1 | 5/2007 | Mendiboure et al. | |
| 2007/0134058 A1 | 6/2007 | Meyer et al. | |

FOREIGN PATENT DOCUMENTS

| | | | |
|---|---|---|---|
| EP | 0 383 498 B1 | | 3/1993 |
| EP | 0453777 | * | 11/1995 |
| EP | 0679501 | * | 11/1995 |
| EP | 0697956 | * | 2/1996 |
| EP | 0 891 918 A1 | | 1/1999 |
| EP | 1 134 126 B1 | | 3/2001 |
| EP | 1 122 156 A2 | | 8/2001 |
| EP | 1031496 | * | 12/2001 |
| EP | 1 182 087 A2 | | 2/2002 |
| EP | 1 006 022 B1 | | 9/2003 |
| EP | 1 362 683 A2 | | 11/2003 |
| EP | 1378399 A1 | | 1/2004 |
| EP | 1 428 744 | | 6/2004 |
| EP | 1 157 916 B1 | | 10/2005 |
| EP | 1 458 594 | | 3/2006 |
| EP | 1 666 228 A2 | | 6/2006 |
| EP | 1731284 A2 | | 12/2006 |
| GB | 2 083 162 A | | 3/1982 |
| JP | 406156317 A | | 6/1994 |
| JP | 10-45031 | | 2/1998 |
| JP | 10053156 | * | 2/1998 |
| JP | 10-71628 | | 3/1998 |
| JP | 2000-52444 | | 2/2000 |
| JP | 2001-62833 | | 3/2001 |
| JP | 2001-88739 | | 4/2001 |
| JP | 2001-199362 | | 7/2001 |
| JP | 2001191949 | * | 7/2001 |
| JP | 2002331960 | | 11/2002 |
| JP | 2002-362412 | | 12/2002 |
| JP | 2003063443 A | | 3/2003 |
| WO | WO97/02967 | | 1/1997 |
| WO | WO 97/43501 | | 11/1997 |
| WO | WO99/08854 | | 2/1999 |
| WO | WO 9964287 | * | 12/1999 |
| WO | WO00/03894 | | 1/2000 |
| WO | WO00/43254 | | 7/2000 |
| WO | WO01/19667 A1 | | 3/2001 |
| WO | WO01/24989 | | 4/2001 |
| WO | WO01/71225 | | 9/2001 |
| WO | WO01/83206 | | 11/2001 |
| WO | WO 01/88033 | | 11/2001 |
| WO | WO03/051676 | | 6/2003 |
| WO | WO03/016934 | | 7/2003 |
| WO | WO03/093064 A1 | | 11/2003 |
| WO | WO2005/044630 | | 5/2005 |
| WO | WO2005/077634 | | 8/2005 |
| WO | WO 2005/105405 | | 11/2005 |

OTHER PUBLICATIONS

Lilley et al., Comparison of Preformed Acoustic Baffles and Two-Component Polyurethane Foams for Filling Body Cavities.
Lilley et al., Vehicle Acoustic Solutions.
Lilley et al., A Comparison of NVH Treatments for Vehicle Floorplan Applications.
Copending U.S. Appl. No. 10/718,509, filed Nov. 20, 2003.
Copending U.S. Appl. No. 10/806,309, filed Mar. 22, 2004.
Copending Patent Application Serial No. GB 0220945.0 filed Sep. 10, 2002.
Copending Patent Application Serial No. EP 0300159.1 filed Jan. 6, 2003.

Copending U.S. Appl. No. 10/920,520, filed Aug. 18, 2004.
Copending U.S. Appl. No. 10/941,553, filed Sep. 15, 2004.
Copending U.S. Appl. No. 10/973,050, filed Oct. 25, 2004.
Copending U.S. Appl. No. 10/967,783, filed Nov. 20, 2004.
Copending U.S. Appl. No. 11/188,679, filed Jul. 25, 2005.
Copending U.S. Appl. No. 11/189,190, filed Jul. 26, 2005.
Copending U.S. Appl. No. 60/709,947, filed Aug. 19, 2005.
Copending U.S. Appl. No. 60/711,101, filed Aug. 25, 2005.
Copending U.S. Appl. No. 60/720,867, filed Sep. 27, 2005.
Copending U.S. Appl. No. 11/254,129, filed Oct. 19, 2005.
Copending U.S. Appl. No. 60/729,820, filed Oct. 25, 2005.
Copending U.S. Appl. No. 60/729,821, filed Oct. 25, 2005.
Copending U.S. Appl. No. 60/740,766, filed Nov. 30, 2005.
Copending U.S. Appl. No. 11/339,431, filed Jan. 25, 2006.
Copending U.S. Appl. No. 60/771,713, filed Feb. 9, 2006.
Copending U.S. Appl. No. 11/339,535, filed Mar. 30, 2006.
Copending U.S. Appl. No. 11/401,207, filed Apr. 10, 2006.
Copending U.S. Appl. No. 60/746,810, filed May 9, 2006.
Copending U.S. Appl. No. 60/747,677, filed May 19, 2006.

* cited by examiner

NOISE REDUCTION MEMBER AND SYSTEM

CLAIM OF PRIORITY

This application claims the benefit of the filing date of U.S. Provisional Application Nos. 60/688,255 filed Jun. 7, 2005.

FIELD OF THE INVENTION

The present invention relates generally to a member for providing noise reduction to an article of manufacture (e.g., an automotive vehicle) through baffling, sound absorption, a combination thereof or the like.

BACKGROUND OF THE INVENTION

For many years, industry (e.g., the transportation industry) has been concerned with designing members for providing noise reduction (e.g., baffling, sound absorption, combinations thereof or the like) to articles of manufacture such as automotive vehicles. Typically, such members include expandable materials, which may or may not be supported by carrier members, and which, upon expansion, form seals, baffles, sound absorption systems or the like in one or more cavities of an article of manufacture. Design of such members can involve multiple competing characteristics For example, it may be desirable for the members to be relatively lightweight while still maintaining the ability to exhibit a relatively high degree of noise reduction. Other desirable characteristics for the members can include, without limitation, low cost, ease of assembly, ease of manufacture compatibility with the articles of manufacture to which the members are applied and other factors. Thus, the present invention provides a noise reduction member and system that exhibits at least one, but preferably multiple desirable characteristics.

SUMMARY OF THE INVENTION

The present invention is directed to a noise reduction member. The member typically includes a carrier member and an expandable material. Preferably, the carrier member includes one or more walls for guiding the expansion of the expandable material and will also typically include an attachment for locating the noise reduction member at least temporarily relative to a structure of an article of manufacture. The expandable material is preferably a relatively high expansion material.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

Figure 1:
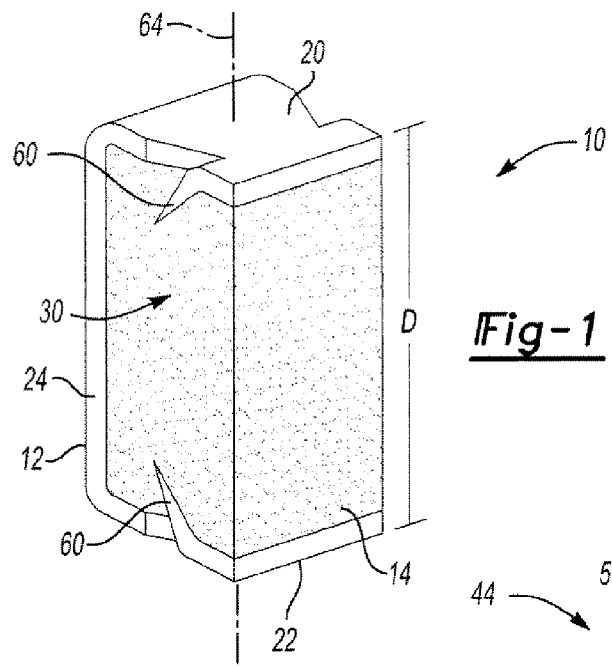
FIG. 1 is a perspective view of an exemplary member in accordance with an aspect of the present invention.

The present invention is predicated upon the provision of a member suitable for providing noise reduction to one or more structures of an article of manufacture typically by providing baffling, sound absorption, sound deflection, a combination thereof or the like to the structures. Together, the one or more structures and the member form a system or assembly that is generally desirable for the article of manufacture because of the functional attributes (e.g., noise reduction, baffling, sealing, strength, reinforcement combinations thereof or the like) provided by the member. It is additionally contemplated that the member may be able to provide structural reinforcement to the structure of an article of manufacture.

It is contemplated that the member may be employed in conjunction with a variety of structures of various articles of manufacture such as boats, trains, buildings, appliances, homes, furniture or the like. It has been found, however, that the member is particularly suitable for application to structures or assemblies of transportation vehicles such as automotive vehicles. Generally, it is contemplated that the member may be applied to various structures such as components of a body, a frame, an engine, a hood, a trunk, a bumper, a pillar combinations thereof or the like of an automotive vehicle.

The noise reduction member typically includes one or more of the following:

i) a carrier member that typically includes at least one, but more preferably two, three or more walls, one of which typically includes a through-hole extending therethrough, although not required;

ii) an expandable member connected to the carrier member wherein the expandable material is typically located adjacent (e.g., between) a first and/or a second wall of the carrier member, although again, not required; and iii) an attachment (e.g., a fastener) connected to the carrier member the expandable material or both.

Upon expansion, the expandable material can, if desired, be configured to substantially entirely fill a section of a cavity in which the member has been placed. In such an embodiment, the expandable material typically expands to form a foam that spans across a cross-section of the cavity for inhibiting or prohibiting the passage of mass (e.g., dust and debris) and or sound (e.g., noise) through the cavity.

The member of the present invention is typically or primarily employed for sound (e.g., noise) reduction within an article of manufacture (e.g., used as a baffle within a cavity of an automotive vehicle). it is contemplated, however, that the member may be additionally or alternatively used as a separator, a reinforcement, a hole plug, a blocking member, a combination thereof or the like.

The member of the present invention is typically comprised of a carrier member and at least one mass of an expandable material connected to and preferably at least partially supported by the carrier member. The carrier member typically includes at least one, but preferably a plurality of walls and the at least one or plurality of walls typically define a cavity suitable for receipt of at least one mass of expandable material.

Figure 2:
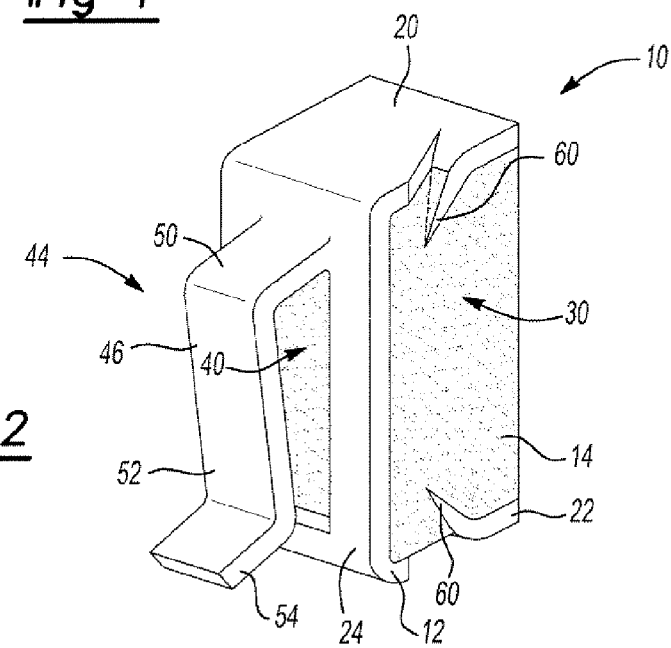
FIG. 2 is another perspective view of the exemplary member of FIG. 1.

Referring to FIGS. 1 and 2, there is illustrated an exemplary member 10 according to the present invention. The member 10 includes a carrier member 12 and a mass 14 of expandable material connected to the carrier member 12. Generally, the carrier member 12 and the mass 14 of expandable material may be shaped in a variety of configurations within the scope of the present invention. Thus, the specific shapes and configurations of the carrier member 12 and the mass 14 of expandable material in the figures and description should not limit the present invention, unless otherwise specifically stated.

The carrier member 12 is shown to have a first or top wall 20, a second or bottom wall 22 and a third or side wall 24 interconnecting the top and bottom walls 20, 22. The first wall 20 opposes the second wall 22 and, in the embodiment shown, the first wall 20 is substantially parallel to the second wall 22. Moreover, the first wall 20, the second wall 22 and the side wall 24 are each substantially planar, although they may be contoured if needed or desired.

Generally, the walls 20, 22, 24 or the carrier member 12 define a cavity 30 suitable for receipt of the mass 14 of expandable material. In the particular embodiment illustrated, the first wall 20 and the second wall 22 (or the planes in which they are disposed) extend away, at skew (e.g., perpendicular) angles 34, 36 relative to the side wall 24 (or the plane in which it is disposed). In this configuration, the first wall 20, the second wall 22 and the third wall 24 form a C-shape thereby defining the internal cavity 30.

It should also be noted that an opening 40 is defined in the carrier member 12 and particularly in the third wall 24 of the carrier member 12. The particular opening 40 shown is illustrated as a generally rectangular through-hole that extends through the third wall 24 or the carrier member 12.

Typically, although not necessarily required, the member of the present invention will include one or more fasteners or attachments which may be connected to the carrier member, the expandable material or both. As such, the fastener or attachment may be formed, molded or shaped of the same material of the carrier member and/or the expandable material or, alternatively, may be a separate member that is attached or connected to one or both of the expandable material and the carrier member. The attachment may also be an attachment medium such as an adhesive or magnetic medium.

It is also contemplated that any fastener of the present invention may be formed in a variety of configurations. Examples include, without limitation, arrowhead fasteners, clip, rivets, interlocking mechanisms, combinations thereof or the like.

The illustrated member 12 includes a fastener 44 attached to and integrally formed of the same material of the carrier member 12. The fastener 44 is illustrated as a flange 46 that opposes a substantial portion of the opening 40 in the side wall 24. The fastener 44 includes a first generally rectangular portion 50 extending outwardly away from the carrier member 12, a second generally rectangular portion 52 cantilevered and extending downwardly away from the first portion 50 and a third generally rectangular portion 54 extending outwardly away from the second portion at an angle.

The carrier member 12 can also include one or more securement flanges 60. Such flanges 60 typically extend toward and/or into the cavity 30 defined by the carrier member 12, although not required. The exemplary illustrated carrier member 12 includes at least one flange 60 extending into and/or toward the cavity 30 from each of the top wall 20 and the bottom wall 22 of the carrier member 12. More particularly, both the top wall 20 and bottom wall 22 include a pair of flanges 60 shown as barbs extending into and/or toward the cavity 30 from adjacent opposite edges of each of the top wall 20 and the bottom wall 22 of the carrier member 12.

The carrier 12 including the walls 20, 22, 24 and the fastener or attachment 44 may be integrally formed of a singular material or may be separately formed of different materials. Materials for the carrier member and its respective components may be formed of or include, without limitation, metals, polymeric materials (e.g., nylon, polyamide, polyester, polypropylene, polyethylene or others), which may be filled or unfilled (e.g., filled with glass reinforcement fibers) or other materials. As such, the carrier member, may be processed and/or formed using metal forming techniques such as bending, extruding or the like and may be processed and/or formed using polymer shaping techniques such as molding (e.g., blow molding, injection molding compression molding or the like). In one preferred embodiment the carrier is integrally formed of a metal material such as aluminum, steel or the like and is stamped into its desired shape (e.g., the shape shown is FIGS. 1-3).

As discussed, the mass of expandable material may be shaped in a variety of different configurations and there may be multiple different masses of expandable material. Preferably, at least one mass of expandable material is located at least partially (e.g., at least 10% of the volume of the mass) or substantially entirely (e.g., at least 70%, 80%, 90% or more) in the cavity of the carrier member, although not required. It is also preferable for, at least one mass of expandable material to be located at least partially (e.g., at least 10% of the volume of the mass) or substantially entirely (e.g., at least 70%, 80%, 90% or more) between the first wall 20 and second wall 22 of the carrier member 12, although not required.

Figure 3:
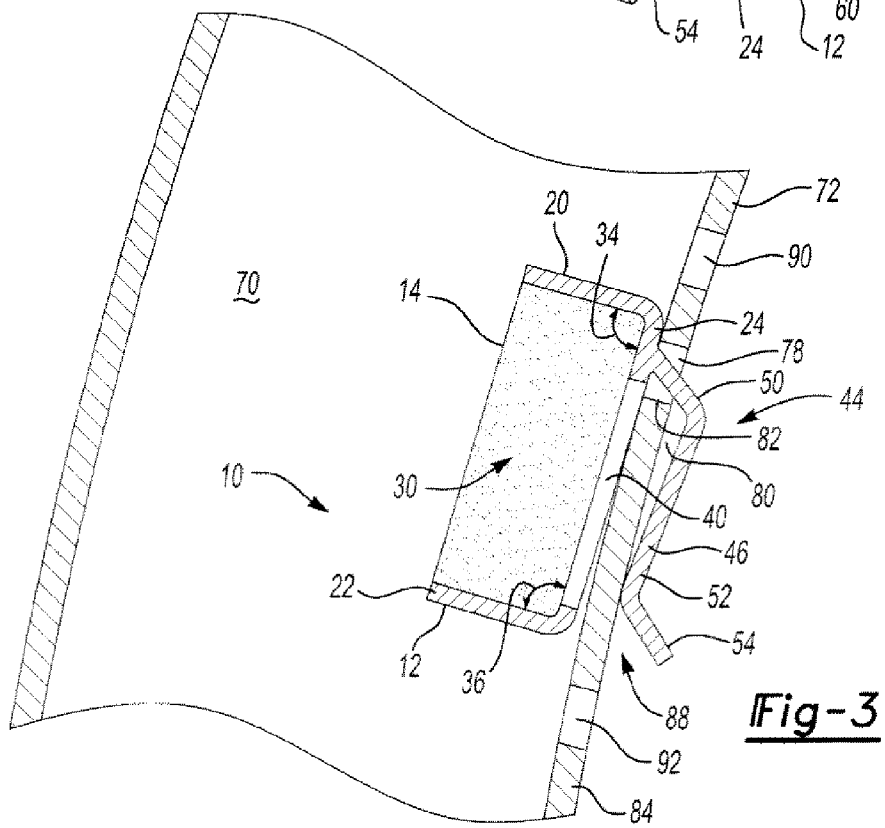
FIG. 3 is a cut away side view of the exemplary member of FIGS. 2 and 3 applied to a structure of an automotive vehicle.

The mass 14 of FIGS. 1-3 extends along an axis 64 of elongation and has at least one dimension (D) extending substantially parallel to that axis 64. That dimension (D) can be selected from length, height or other dimension. In one embodiment, any and/or every diameter of the mass of expandable material taken perpendicular to the elongated axis 64 are shorter than the dimension (D). As used herein, diameter is meant to include any line segment extending from one surface of the mass to another surface of the mass.

It is contemplated that the mass of expandable material may be formed into a variety of shapes and configurations. The walls of the mass may be planar or contoured and the mass may be geometric or non-geometric or a combination thereof. In the embodiment illustrated, the mass 14 of expandable material is generally shaped as a polyhedron having sides that are respectively square and rectangular.

The volume of the mass of expandable material may be relatively large or relatively small prior to expansion thereof. As such, the size or volume of the mass should not be limited unless otherwise specifically stated. Generally, however, preferred embodiments of the invention have a mass of expandable material with a volume that is greater than about 0.5 cm$^3$, more typically greater than about 1.0 cm$^3$, and even more typically greater than about 1.5 cm$^3$ and a volume that is less than about 10 cm$^3$, more typically less than about 4.0 cm$^3$ and even more typically less than about 2.0 cm$^3$.

A variety of expandable materials may be used for the mass of expandable material of the present invention. In one embodiment, the material may be formed of a heat activated material and may flow, cure (e.g., be thermosettable), foam or a combination thereof upon exposure to heat. The expandable material may be generally dry to the touch and substantially tack free or may be tacky and, in either situation, may be shaped in any form or desired pattern, placement, or thickness, but is preferably of substantially uniform thickness. Exemplary expandable materials are L-7102 and L-7220 foam available through L&L Products, Inc. of Romeo, Mich. Another exemplary expandable material is disclosed in U.S. patent application titled "Expandable Material", Ser. No. 10/867,835, filed on Jun. 15, 2004 and incorporated herein by reference for all purposes.

Though other heat-activated materials are possible, a preferred heat activated material is an expandable polymer or plastic, and preferably one that is foamable. Particularly preferred materials are epoxy-based, acrylate-based or acetate-based foams, which may be structural, sealing, sound damping, sound absorbing, sound attenuating or a combination thereof. For example, and without limitation, the foam may be an epoxy-based material, including an ethylene copolymer or terpolymer that may possess an alpha-olefin. As a copolymer or terpolymer, the polymer is composed of two or three different monomers, i.e., small molecules with high chemical reactivity so that are capable of linking up with similar molecules.

A number of epoxy-based or otherwise based sealing, baffling or acoustic foams are known in the art and may employed in the present invention. A typical foam includes a polymeric base material, such as an epoxy resin or ethylene-based polymer which, when compounded with appropriate ingredients (typically a blowing and curing agent), expands and cures in a reliable and predictable manner upon the application of heat or the occurrence of a particular ambient condition. From a chemical standpoint for a thermally-activated material, the structural foam is usually initially processed as a flowable thermoplastic material before curing. It will cross-link upon curing, which typically makes the material incapable of further flow (e.g., thermoset).

One advantage of the preferred foam materials over prior art materials is that the preferred materials can be processed in several ways. The preferred materials can be processed by injection molding, extrusion, compression molding or with a mini-applicator. This enables the formation and creation of part designs that exceed the capability of most prior art materials.

While preferred materials have been disclosed, other materials may be used as well, particularly materials that are heat-activated or otherwise activated by an ambient condition (e.g. moisture, pressure, time, chemical reaction or the like) and cure in a predictable and reliable manner under appropriate conditions for the selected application. Of course, the material may also be formed of non-activatable materials, non-expandable materials or otherwise. Thus, upon activation, the material may soften, cure and expand; soften and cure only; cure only; soften only; or may be non-activatable.

One example of an expandable material is the epoxy based resin disclosed in U.S. Pat. No. 6,131,897, the teachings of which are incorporated herein by reference. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755,486; 5,575,526; and 5,932,680, (incorporated by reference). In general, desired characteristics of the material can include adhesion durability properties or the like, although such properties are not necessarily required. Generally, it is desirable that the material does not generally interfere with the materials systems employed by automobile manufacturers or other manufactures.

Other exemplary expandable materials can include combinations of two or more of the following: epoxy resin, polystyrene, styrene butadiene-styrene (SBS) block copolymer, butadiene acrylo-nitrile rubber, amorphous silica, glass microspheres, azodicarbonamide, urea, dicyandiamide. Examples of such materials are sold under the tradename SIKAELASTOMER, SIKAREINFORCER and SIKABAFFLE and are commercially available from the Sika Corporation, Madison Heights, Mich.

In applications where the material is a heat activated, thermally expanding and/or foaming material, an important consideration involved with the selection and formulation of the material forming the foam is the temperature at which a material reaction or expansion, and possibly curing, will take place. Typically, certain expandable material ingredients become reactive at higher processing temperatures, such as those encountered in an automobile assembly plant, when the material is processed and/or activated along with the automobile components at elevated temperatures or at higher applied energy levels, e.g., during paint or e-coat baking or curing steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, various different blowing agents or blowing agent activators can be incorporated into the composition to cause expansion at different temperatures outside the above ranges. Generally, suitable expandable materials have a volumetric range of expansion ranging from approximately 0 to over 1000 percent. For example a mass of expandable material may expand to form a foam that occupies a volume that is (e.g., is at least partially located within) at least 150%, 200%, 500%, 1000%, 1500%, 2000% or 3000% of the volume occupied by the original unexpanded mass of expandable material.

The material or medium may be at least partially coated with an active polymer having damping characteristics or other heat activated polymer, (e.g., a formable hot melt adhesive based polymer or an expandable structural foam, examples of which include olefinic polymers, vinyl polymers, thermoplastic rubber-containing polymers, epoxies, urethanes or the like) placed along the mold through the use of baffle technology; a die-cast application according to teachings that are well known in the art; pumpable application systems which could include the use of a baffle and bladder system; and sprayable applications.

Formation

The noise reduction member of the present invention may be formed according to a variety of protocols. Generally, the mass of expandable material is placed adjacent one or more walls of the carrier member. It is contemplated that the carrier member may be formed to its desired shape followed by placement of the mass of expandable material at least partially within or more substantially entirely within the cavity formed by the carrier member. In the illustrated embodiment, the carrier member 12 is formed to shape and the mass 14 is automatically, semi-automatically or manually placed within the cavity 30 of the carrier member 12. As can be seen, the flanges 60 of the carrier member 12 contact and/or extend into the mass 14 of expandable material for maintaining the position of the mass 14 relative to the carrier member 12.

In alternative embodiments, it is contemplated that the carrier member may formed (e.g., bent or otherwise shaped) about the mass of expandable material such that the mass of expandable material is automatically located within the cavity defined by the carrier member. In such an embodiment, a machine such as a press may be employed to press fit the carrier member about the mass of expandable material.

As another alternative the mass of expandable material and carrier member are formed and/or shaped substantially simultaneously or at close proximity in time relative to each other (e.g., within 30 minutes, 2 minutes or even 10 seconds). For example, material of the carrier member and the expandable material may be co-extruded and then the coextrusion may be cut to shape the noise reduction member.

Application

The noise reduction member nay be applied to a variety of locations upon a variety of structures of a variety of articles of manufacture. Typically, the attachment of the noise reduction member will be employed for attaching the noise reduction member to a structure of an article.

For automotive vehicles, the noise reduction member can be located within cavities that are at least partially or substantially entirely formed by automotive vehicle structures such as frame members, body members, roof rails, closure panels (e.g., doors, hoods, trunk lids, tail gates, etc.), or others. In one embodiment, the noise reduction member is particularly suitable for application, acoustic dampening, baffling, sealing or a combination thereof within or adjacent a pillar (e.g., a forward or A-pillar, a central or B or C-pillar or a rearward or C or D-pillar) of an automotive vehicle. For example, the baffle may be located adjacent or within a cavity formed by the pillar for prohibiting or inhibiting the passage of material or sound through the cavity.

Generally, after location of the noise reduction member relative to a structure, the mass of expandable material is typically activated to flow, expand, foam, cure, harden, adhere or any combination thereof. If located within a cavity of a structure, the mass is typically activated to expand or foam to substantially fill and span a cross-section of the cavity of the structure for prohibiting or inhibiting the passage of material or sound through the cavity.

In FIG. 3, the exemplary member 10 has been placed in a cavity 70 of a structure 72 of an automotive vehicle. The structure 72 illustrated is a frame structure or pillar of a vehicle but it shall be understood that the structure may be any of structures discussed herein and other structures as well.

For at least temporarily locating the member 10 in the cavity 70, the fastener 44 of the member 10 has been attached to the structure 72. In the illustrated embodiment, the flange 46 of the fastener 44 of the noise reduction member 10 is extended into and through an opening 78 (e.g., a throughhole) in the structure 72 for attaching the member 10 to the structure. As shown, a cavity 80 is defined between the fastener 44 and the mass 14 of expandable material, the carrier member 12 or both for receiving an edge 82 of a panel 84 of the structure 72 upon insertion of the fastener into the opening 78 of the structure 72. Also, as shown, the cavity 80 includes a widened receiving portion 88 defined by the third outwardly angled portion 54 of the fastener 44 for assisting in extending the fastener 44 through the opening 78 and receiving the edge 82. As can be seen, the member 10 has been located in the cavity 70 such that the first or top wall 20 is directly adjacent and/or below an opening 90 (e.g., a through-hole) in the structure 72 and/or the second or bottom wall 22 is directly adjacent and/or above another opening 92 (e.g., throughhole) in the structure 72.

Figure 4:
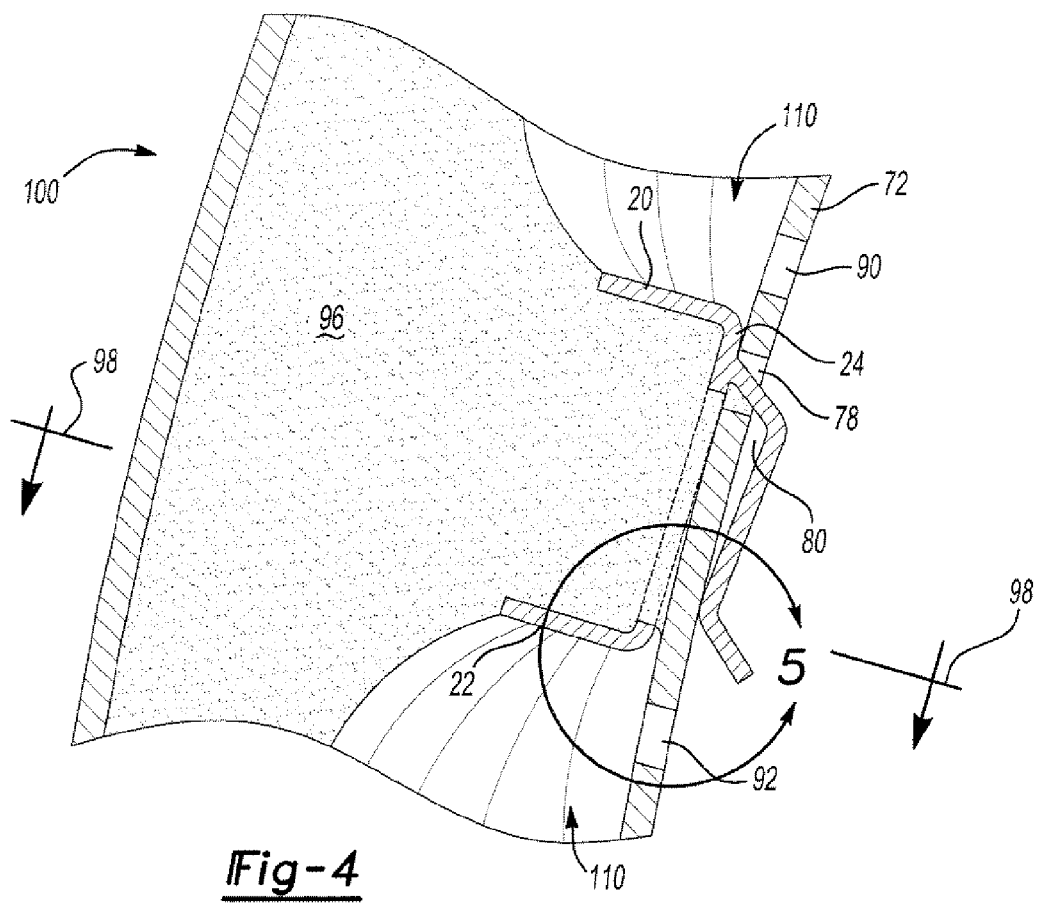
FIG. 4 is a cut away side view of the exemplary member and structure of FIG. 3 after expansion of an expandable material of the member to form an exemplary system.
Figure 5:
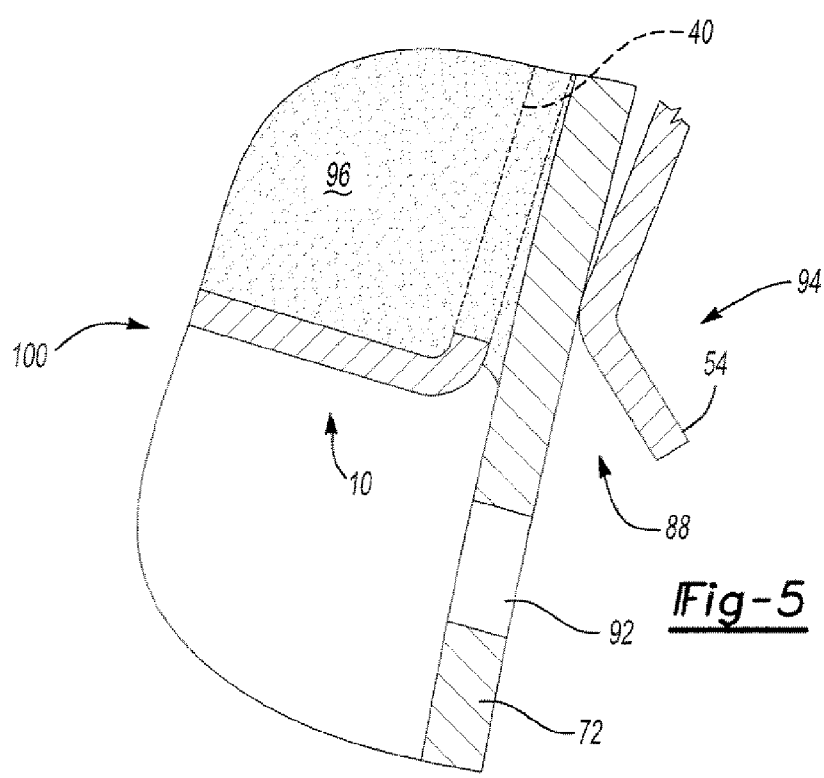
FIG. 5 is a magnified view of a portion of the exemplary system of FIG. 4.

Upon activation of the mass 14 of expandable material, the mass 14 foams and expands within the cavity 70 of the structure 72. As shown in FIGS. 4 and 5, the mass 10 is expanded to form or expanded a foam material 96 that adheres to walls of the structure 72 defining the cavity 70 and expands such that the foam material 96 substantially fills and span a crosssection 98 of the cavity 70 of the structure 72 for prohibiting or inhibiting the passage of material or sound through the cavity 70. In this manner, the member 10 forms a noise reduction system 100 in conjunction with the structure 72. Advantageously, the opening or hole 40 in the side wall 24 allows the foam material 96 to expand and/or extend through the opening 40 and connect with other portions of the foam material 96 such that the foam material 96 more substantially entirely spans the cross-section 98 defined by a plane extending outwardly and into from the page at the line defining the cross-section 98 to inhibit or prohibit passage of sound (e.g., noise) and mass or materials through the cavity.

As an added advantage, the first or upper wall 20 of the carrier member 12 and/or the second or lower wall 22 of the carrier member 12 prohibit or at least inhibit the mass 14 of expandable material from expanding over and partially or substantially entirely covering the openings 90, 92 of the structure 72 by the foam material 96. As can be seen, the walls 20, 22 assist the expandable material in forming the foam material 96 with cavities 110 that provide space about the openings 90, 92. Thus, these openings 90, 92 remain useful for allowing components such as wiring to extend into and through the openings 90, 92.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A noise reduction member, comprising:
a structure of an automotive vehicle, the structure having a wall defining a first through-hole, a second through-hole and a third through-hole;
a carrier member having a top wall, a bottom wall and side wall interconnecting the top and bottom walls, wherein:
i) a rectangular through-hole is defined in the side wall of the carrier member;
ii) the top and bottom wall are substantially parallel to each other and generally oppose each other;
iii) the top wall, the bottom wall and the side wall are each substantially planar;
iv) the top wall and the bottom wall extend away, at perpendicular angles relative to the side wall and cooperatively the top wall, the bottom wall and the side wall define an internal cavity;
v) the carrier member is formed substantially entirely of metal and includes extensions;
a mass of expandable material located substantially entirely in the cavity of the carrier member, extending along an elongated axis and having a dimension selected length or height parallel to that axis, wherein:
i) any diameter of the mass of expandable material taken perpendicular to the elongated axis are shorter than the dimension;
ii) the mass of expandable material is substantially entirely located between the top wall and the bottom wall;
iii) the mass of expandable material is generally shaped as a polyhedron having sides that are rectangular;
iv) the mass of expandable material is configured to volumetrically expand to a volume that is at least 3000% of its original unexpanded volume;
a fastener attached to the carrier member, the expandable material or both, the fastener being a flange that opposes a substantial portion of the opening in the side wall, wherein the fastener includes:

i) a first generally rectangular portion extending outwardly away from the carrier member;

ii) a second generally rectangular portion cantilevered and extending downwardly away from the first portion; and iii) a third generally rectangular portion extending outwardly away from the second portion at an angle;

wherein a cavity is defined by the fastener and the expandable material, the carrier member or a combination thereof for receiving an edge of a panel of a structure upon insertion of the fastener into an opening of the structure and wherein the cavity includes a widened receiving portion defined by the third outwardly angle portion of the fastener and wherein the extensions of the carrier member contact the expandable material for assisting in positioning and maintaining the expandable material in a location relative to the carrier member and wherein the fastener extends through the first through-hole for locating the carrier member and the expandable material within a cavity of the structure of the automotive vehicle such that the second through-hole is directly adjacent and above the top wall of the carrier member and the third through-hole is directly adjacent and below the bottom wall of the carrier member and wherein, upon expansion of the expandable material, the top wall shields the second through-hole and the bottom wall shields the third through-hole from being covered by foam formed by the expandable material and wherein the top wall and bottom wall of the carrier member extend less than half a distance across the cavity.

* * * * *